US012687249B2

(12) United States Patent
Hsu

(10) Patent No.: US 12,687,249 B2
(45) Date of Patent: Jul. 21, 2026

(54) FEMALE COUPLER CONNECTION STRUCTURE

(71) Applicant: FOSITEK CORPORATION, New Taipei City (TW)

(72) Inventor: An-Szu Hsu, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 19/002,561

(22) Filed: Dec. 26, 2024

(65) Prior Publication Data

US 2026/0132876 A1     May 14, 2026

(30) Foreign Application Priority Data

Nov. 11, 2024    (TW) ................................. 113143225

(51) Int. Cl.
*F16L 37/14*        (2006.01)
*F16L 37/088*      (2006.01)

(52) U.S. Cl.
CPC ........... *F16L 37/14* (2013.01); *F16L 37/0885* (2019.08)

(58) Field of Classification Search
CPC ....... F16L 37/123; F16L 37/122; F16L 37/22; F16L 37/121; F16L 37/127; F16L 37/133; F16L 37/138; F16L 37/14; F16L 37/142; F16L 37/18; F16L 37/096; F16L 37/098; F16L 37/0982; F16L 37/0985; F16L 37/0844; F16L 37/0847; F16L 37/0885; F16L 37/0887
See application file for complete search history.

(56) References Cited

U.S. PATENT DOCUMENTS

2007/0114794 A1* 5/2007 Frost ......................... B08B 3/00
285/317

FOREIGN PATENT DOCUMENTS

| CN | 205578985 U | 9/2016 |
| CN | 216715550 U | 6/2022 |
| TW | M667367 U | 3/2025 |

OTHER PUBLICATIONS

Search Report dated Apr. 3, 2025 issued by Taiwan Intellectual Property Office for counterpart application No. 113143225.

* cited by examiner

*Primary Examiner* — Aaron M Dunwoody
(74) *Attorney, Agent, or Firm* — Demian K. Jackson; Jackson IPG PLLC

(57) ABSTRACT

A female coupler connection structure includes a main body having an internal plugging passage and a front engagement section with two diametrically opposite tangential slots communicable with the plugging passage; a retaining module fitted around the engagement section and including two pin members that pass through the tangential slots into the plugging passage to provide an actuation portion; a spring having two ends pressed against the retaining module and an annular locating groove formed around the engagement section; and a pulling cover fitted around the retaining module, which has a front end pressed against the pulling cover. A male coupler can be locked to or unlocked from the plugging passage by moving the pulling cover to swing the pin members. The female coupler connection structure requires a relatively short operating distance and can be advantageously used in a relatively narrow space to connect to or disconnect from the male coupler.

9 Claims, 10 Drawing Sheets

FEMALE COUPLER CONNECTION STRUCTURE

This application claims the priority benefit of Taiwan patent application number 113143225 filed on Nov. 11, 2024, the disclosure of which is hereby incorporated by reference in its entirety.

FIELD OF THE INVENTION

The present invention relates to a coupler structure, and more particularly, to a female coupler connection structure.

BACKGROUND OF THE INVENTION

Quick connect couplers are frequently used in fluid transport. Generally, the currently available quick connect couplers include a male coupler and a female coupler that are designed to be correspondingly connected with or disconnected from each other quickly. However, in the existing cabinets, such as those in a data center, there is only very limited internal space, which can provide only very short operating distance for the conventional quick connect coupler while the male and female couplers thereof requires a relatively long operating distance.

For example, the conventional male and female couplers use ball-latching to achieve the function of limiting the male and female couplers from moving relative to each other axially. As shown in FIG. 1, to ensure stable axial connection of the conventional male and the female couplers, at least one row of steel balls 91 or a plurality of rows of symmetrically or staggeredly arranged steel balls 91 is correspondingly provided in the female coupler at a position facing toward a front opening of a tubular body 90 of the female coupler, so that the male coupler (not shown) can be plugged in and axially connected with the female coupler. However, in this case, both the male and the female coupler must be provided in an axial direction with holes for correspondingly engaging with the steel balls 91 to achieve the purpose of axial connection of the male and the female coupler. This conventional coupler connection structure has the disadvantages of having a big volume, requiring a relatively long operating distance to axially connect and disconnect the male and female couplers, and unstable axial connection effect.

It is therefore tried by the inventor to develop an improved female coupler connection structure to overcome the problem that the conventional male and female couplers require a relatively long operating distance and can not be conveniently used in a narrow environment, such as in the cabinets and chassis in a data center.

SUMMARY OF THE INVENTION

To effectively solve the problems in the prior art, a primary objective of the present invention is to provide an improved female coupler connection structure, with which a female coupler and a male coupler can be connected and disconnected within a reduced operating distance.

To achieve the above and other objectives, the female coupler connection structure according to the present invention includes a main body, a retaining module, a spring, and a pulling cover.

The main body internally defines a plugging passage extending therethrough, and includes an engagement section located at a front end thereof. The engagement section is provided on its outer peripheral wall with two diametrically opposite tangential slots, each of which defines a through opening communicable with the plugging passage.

The retaining module is fitted on around the engagement section and has at least a part being snap-fitted in the tangential slots. The retaining module includes at least one pin member, such as two. The pin members respectively have an actuation portion that can pass the through opening into the plugging passage. The actuation portions are limited in position between the spring and an inner wall of the through openings.

The spring is fitted on around the engagement section with two an end pressed against a rear end of the retaining module and another end pressed against an annular locating groove formed around an outer surface of the engagement section. The pulling cover is fitted on an outer side of the spring and the retaining module, while the retaining module has a front end pressed against the pulling cover.

In the female coupler connection structure, the pulling cover can be pulled to swing the pin members, such that pin members can lock to or unlock from a male coupler that is axially plugged into plugging passage. With the present invention, the female coupler provides a relatively short operating distance to facilitate quick connection and disconnection of the male coupler to and from the female coupler. Meanwhile, the female and the male coupler can be more stably connected and held in place in an axial direction; and the assembled female and male couplers can have a reduced overall structural size.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof.

Figure 1:
FIG. 1 is a sectional side view of a conventional ball-latching quick disconnect coupling structure.
Figure 2:
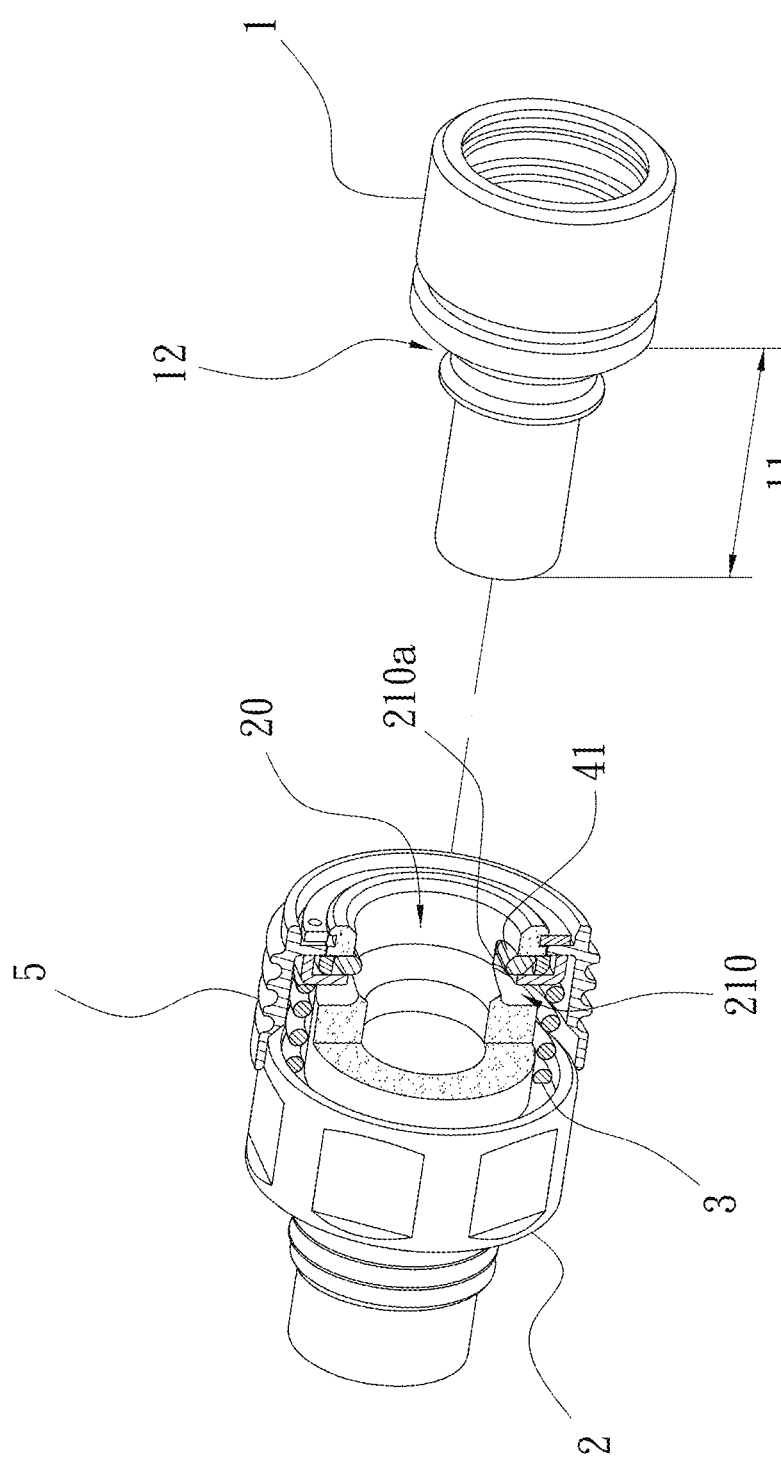
FIG. 2 is a cutaway view of a female coupler connection structure according to a preferred embodiment of the present invention for correspondingly connecting with a male coupler.
Figure 3:
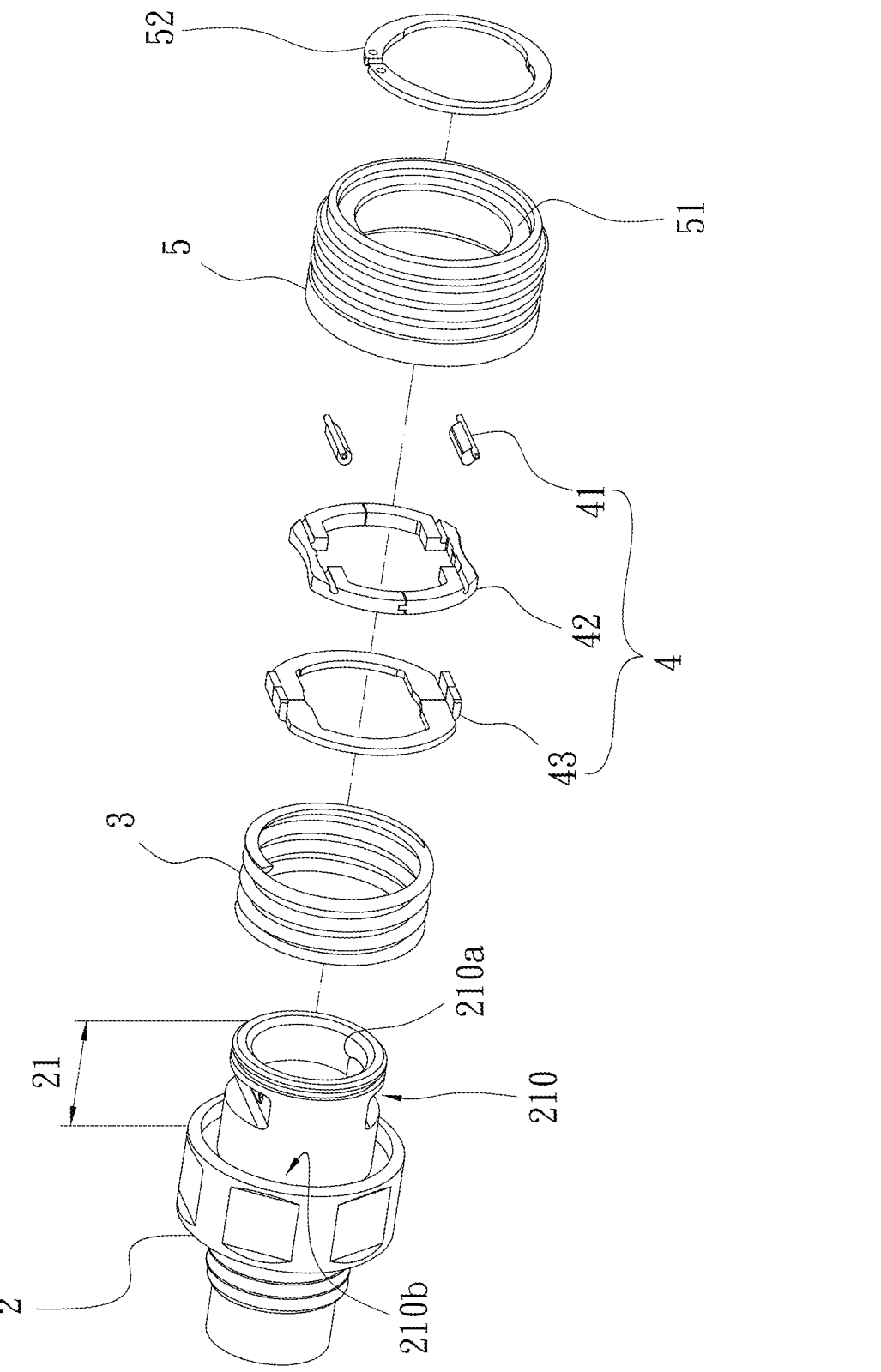
FIG. 3 is an exploded perspective view of the female coupler connection structure of FIG. 2.
Figure 4A:
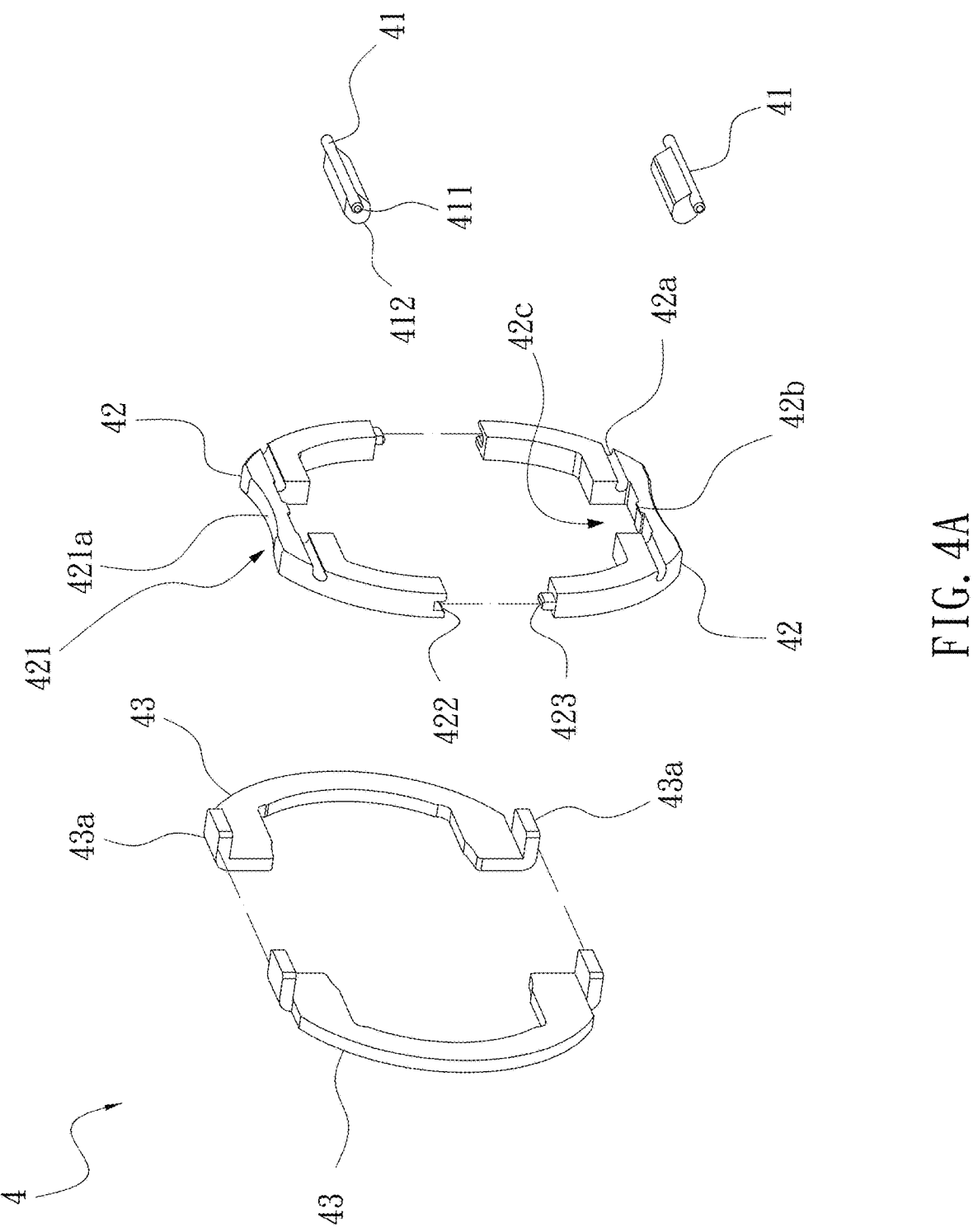
FIG. 4A is an exploded perspective view of a retaining module included in the female coupler connection structure of the present invention.
Figure 4B:
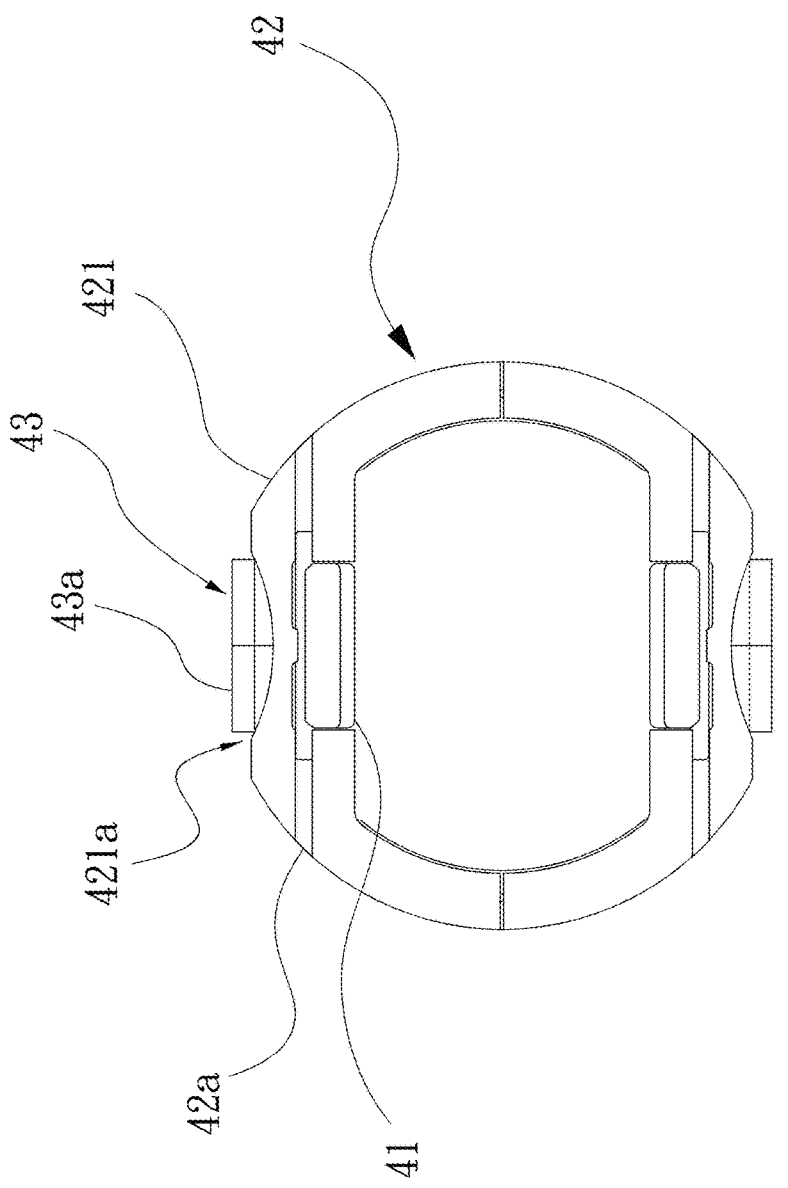
FIG. 4B is an assembled view of the retaining module of FIG. 4A.
Figure 5:
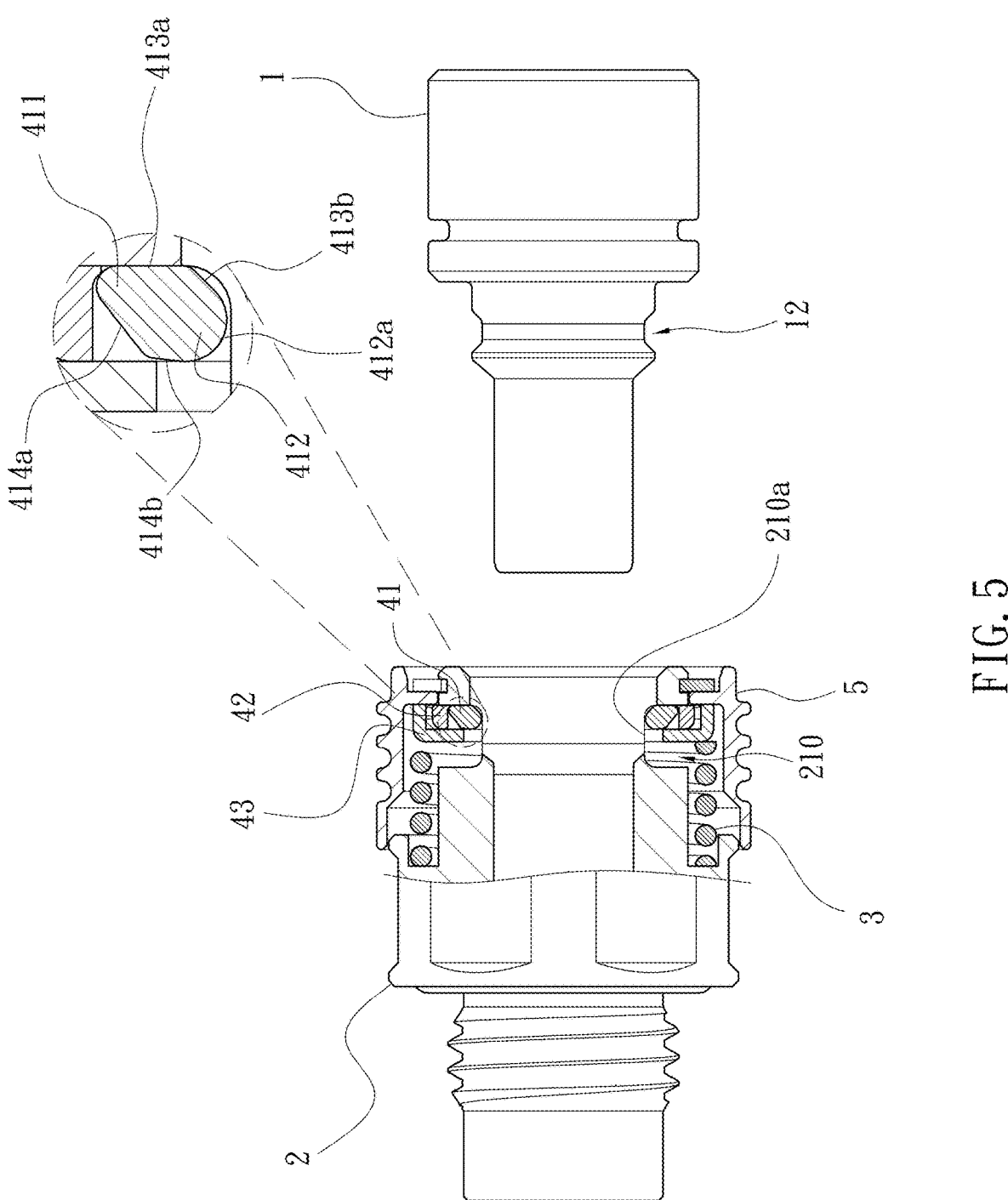
FIG. 5 is a sectional side view showing a portion of the female coupler connection structure of the present invention for connecting with the male coupler.

Please refer to accompanied drawings, FIG. 2 is a cut-away view of a female coupler connection structure according to a preferred embodiment of the present invention for correspondingly connecting with a male coupler 1; FIG. 3 is an exploded perspective view of the female coupler connection structure of the present invention; FIGS. 4A and 4B are exploded and assembled views, respectively, of a retaining module 4 included in the female coupler connection structure of the present invention; FIG. 5 is a sectional side view showing a portion of the female coupler connection structure of the present invention for connecting with the male coupler 1; and FIGS. 6 to 9 are fragmentary and enlarged sectional side views showing the portion of the female coupler connection structure of FIG. 5 for connecting with the male coupler.

As shown in FIGS. 2 and 3, the female coupler connection structure according to a preferred embodiment of the present invention is used as a female coupler for connecting with a corresponding male coupler 1. The male coupler 1 includes a plug section 11 having a retaining groove 12 formed around an outer surface thereof. The female coupler connection structure includes at least a main body 2, a spring 3, a retaining module 4, and a pulling cover 5.

The main body 2 is internally provided with a plugging passage 20 axially extending therethrough, and the plug section 11 of the male coupler 1 is guided through a front end into the plugging passage of the female coupler connection structure. As shown in FIG. 3, the main body 2 includes an engagement section 21 located adjacent to the front end of the female coupler connection structure.

The engagement section 21 is provided on its peripheral wall at two diametrically opposite sides with a tangential slot 210 each in correspondence to the retaining groove 12 on the male coupler 1. Each of the tangential slots 210 can be formed by tangentially cutting a circular cross section of the tubular engagement section 21 at an eccentric position thereof. The tangential slots 210 respectively define a through opening 210a communicable with the plugging passage 20.

The retaining module 4 is provided around an outer side of the engagement section 21. For example, a portion of the retaining module 4 for fitting around the engagement section 21 is substantially C-shaped and other portions of the retaining module 4 corresponding to the tangential slots 210 are substantially straight in design, such that the retaining module 4 is partially set in the tangential slots 210 and limited in place by two side walls of the tangential slots 210. Therefore, the retaining module 4 is interfered by the tangential slots 210 and axially retained to the main body 2.

The retaining module 4 includes at least one pin member 41. The pin members 41 are pivotably fitted on the retaining module 4 at positions near the tangential slots 210. The pin members 41 respectively include an actuation portion 412 and a shaft portion 411. The actuation portions 412 can pass the through openings 210a into the plugging passage 20, and the shaft portions 411 are pivotally provided on the retaining module 4, enabling the pin members 41 to rotate correspondingly. In the present invention, when the actuation portions 412 enter the plugging passage 20 and are subjected to an external force, the pin members 41 are brought to rotate relative to the retaining module 4.

As can be seen in FIGS. 3, 4A and 4B, the retaining module 4 includes two fixing frames 42 and two spring push members 43. The fixing frames 42 respectively have a generally C-shaped configuration and possess a degree of elasticity. The middle section of each of the C-shaped fixing frames 42 is a transverse section 421 substantially in the form of a straight bar. The two fixing frames 42 are located at upper and lower sides and are snap-joined to form a substantially loop-shaped body for fitting around the engagement section 21, such that the two transverse sections 421 are set in the two tangential slots 210, and the retaining module 4 is axially immovably retained to the main body 2. The two spring push members 43 are located at left and right sides and are snap-joined to fit around the engagement section 21, such that the spring push members 43 are axially located behind the fixing frames 42 relative to the through openings 210a.

Each of the two spring push members 43 includes two horizontal tenons 43a, which are correspondingly located at top and bottom of the spring push member 43. Each of the spring push members 43 can be an upright C-shaped member with the two horizontal tenons 43a correspondingly located at upper and lower ends of the C-shaped member. The spring push members 43 and the fixing frames 42 are assembled to form the retaining module 4 for the same to be fitted around an outer side of the engagement section 21, while the horizontal tenons 43a of the spring push members 43 are projected toward a front end of the main body 2 and the upper and lower transverse sections 421 of the fixing frames 42 are vertical clamped in a space defined by between two upper and two lower horizontal tenons 43a. With these arrangements, the fixing frames 42 have their top and bottom being limited between two upper and two lower horizontal tenons 43a of the two spring push members 43, and the two spring push members 43a provide two balanced limiting force to the fixing frames 42 from the right and left sides thereof.

In some embodiments, the distance between the upper and lower horizontal tenons 43a of each spring push member 43 can be slightly smaller than a total vertical height of the assembled upper and lower fixing frames 42. Further, the transverse sections 421 of the fixing frames 42 that are clamped between the two upper and the two lower horizontal tenons 43a of the two spring push members 43 are provided at respective upper and lower outer sides with a recessed portion 421a. The fixing frames 42 having a degree of elasticity can be deformed for the upper and the lower horizontal tenons 43a to move into a space defined by the upper recess 421a and the lower recess 421a, respectively. Therefore, the two upper horizontal tenons 43a of the right and the left spring push member 43 are laterally in contact with and abutted against each other, and so do the two lower horizontal tenons 43a of the right and the left spring push member 43. Besides, two laterally outer sides of both the two upper horizontal tenons 43a and the two lower horizontal tenons 43a are abutted on two lateral inner sides of the upper and lower recesses 421a, respectively. With these arrangements, while the two fixing frames 42 are limited by the spring push members 43 from moving upward and downward, they are also limited from moving sidewardly relative to the spring push members 43.

Further, to enable a tight fit of the upper fixing frame 42 with the lower fixing frame 42, the two C-shaped fixing frames 42 are provided on respective two ends, i.e. where the upper and lower fixing frames 42 are joined, with two insertion holes 422 and two corresponding insertion bosses 423, such that two fixing frames 42 having the same configuration can be up-down symmetrically connected to each other by engaging the insertion holes 422 with the insertion bosses 423.

In an embodiment, every fixing frame 42 is provided on a front side with two pivotal grooves 42a, which are recessed from the same side of the transverse section 421 and located at two lateral ends of the transverse section 421. The shaft portions 411 of the pin members 41 can be pivotally set in these pivotal grooves 42a. Further, the fixing frames 42 are respectively provided at a central area of the transverse section 421 opposite to the recesses 421a with a gap 42c for receiving the pin members 41 therein. The actuation portions 412 of the pin members 41 can pass the through openings 210a into the plugging passage 20, such that the actuation portions 412 can rotate about the shaft portion 411 in the plugging passage 20.

The transverse sections 421 are provided on respective one side radially facing toward the through openings 210a with a protruded stop portion 42b. The protruded stop portions 42b are abutted on and push against the shaft portions 411 located in the pivotal grooves 42a thereby stopping the shaft portions 411 from moving. For example, since the shaft portions 411 are elongated and straight in shape, the pivotal grooves 42a for receiving the shaft portions 411 must respectively provide a full opening having a corresponding projected area. However, the stop portions 42b would at least partially hinder the openings of the pivotal grooves 42a, such that one side of the shaft portions 411 directly facing toward the projected areas of the openings could not fully pass the openings of the pivotal grooves 42a. Nevertheless, since the retaining module 4 has a degree of elasticity, the stop portions 42b can be deformed for the shaft portions 411 to move into the openings of the pivotal grooves 42a. After that, so long as the force applied to the shaft portions 411 is within a predetermined range, the stop portions 42b can provide the effect of limiting the shaft portions 411 to the pivotal grooves 42a.

Since the shaft portions 411 would rotate along with the actuation portions 412, the stop portions 42b can be formed on the edges of the pivotal grooves 42a farther away from the plugging passage 20 to correspond to the actuation portions 412. With this arrangement, when the shaft portions 411 rotate toward the openings of the pivotal grooves 42a, they will bring other parts of the pin members 41 to rotate and press against the stop portions 42b, such that the stop portions 42b can stop the shaft portions 411 from moving out of the pivotal grooves 42a. Further, with the elasticity of the material forming the retaining module 4, the stop portions 42b can also apply a force opposite to a rotation direction of the actuation portions 412, forcing the pin members 41 to turn reversely after the external force applied to the stop portions 42b are removed.

The engagement section 21 is provided around a rear end thereof with an annular locating groove 210b. The spring 3 is fitted around an outer peripheral surface of the engagement section 21 with two ends of the spring 3 pressed against between the retaining module 4 and the annular locating groove 210b. Therefore, the spring 3 can provide a push force or an elastic force toward two ends thereof. When assembling the female coupler connection structure, first fit the spring 3 around the engagement section 21, and then mount the retaining module 4 on the engagement section 21. The annular locating groove 210b can stably limit the spring 3 to the main body 2 of the female coupler connection structure without moving away from the annular locating groove 210b due to an external force applied to the spring 3. However, it is understood the present invention is not particularly restricted to the above embodiment.

After the above assembling is completed, the pulling cover 5 is assembled to an outer peripheral side of the spring 3 and the retaining module 4, with a front end of the retaining module 4 pressed against the pulling cover 5.

Please refer to FIGS. 3 to 5. The spring 3 has an end pressed against the annular locating groove 210b and another end pressed against one side of the retaining module 4 having the spring push members 43, and the fixing frames 42 have their front end pressed against a linkage portion 51, which is formed by radially inward reducing a front end of the pulling cover 5. When a user applies a force at the pulling cover 5, the linkage portion 51 can bring the retaining modular 4 to compress the spring 3 and moves toward a rear end of the female coupler connection structure. To prevent the pulling cover 5 from separating from the main body 2, a limiting ring 52 can be fitted around the outer circumferential surface of the engagement section 21 at an axial position even closer to the front end of the main body 2 than the linkage portion 51, so as to limit an axial position of the linkage portion 51 and prevent the pulling cover 5 from axially separating from the front end of the female coupler connection structure.

In the present invention, the actuation portions 412 can pass the through openings 210a and rotate in the plugging passage 20. As shown in FIG. 5, when the male coupler 1 has not yet been connected to the female coupler connection structure and is not subjected to any external force, the spring 3 is pressed against a rear end of the retaining module 4, such that the retaining module 4 is pushed by the spring 3 to tightly press against the front end of the female coupler connection structure.

Please refer to FIGS. 4A, 4B and 5. In some embodiments, the actuation portions 412 of the pin members 41 respectively have a front end in the form of a curved top end surface 412a. The curved top end surface 412a is extended from two opposite sides to form a front flat pressing surface 413b and a rear flat pressing surface 414b, and a front side wall 413a is formed between the front flat pressing surface 413b and the shaft portion 411 while a rear side wall 414a is formed between the rear flat pressing surface 414b and the shaft portion 411.

The curved top end surface 412a extended from the shaft portion 411 to the actuation portion 412 defines the longest radius of rotation of the pin member 41. For the pin members 41 to rotate, the through openings 210a should have an axial width substantially larger than the longest radius of rotation.

In more detail, when one of the front side wall 413a and the rear side wall 414a is subjected to a pressing force, the front wall 413a or the rear side wall 414a subjected to the pressing force can be flatly attached to the surface correspondingly exerts the pressing force. Therefore, when the female coupler connection structure is not subjected to any external force and the spring 3 has its two ends pressed against the annular locating groove 210b and the retaining module 4, the pin members 41 would rotate forward and the front side walls 413a are brought to rotate and tightly contact with an inner wall of the through openings 210a while the rear flat pressing surfaces 414b are pushed against the spring push members 43, and the pin members 41 are limited by the spring 3 and the inner walls of the through openings 210a to a forward location.

Figure 6:
FIG. 6 is a first fragmentary and enlarged sectional side view showing the portion of the female coupler connection structure of FIG. 5 for connecting with the male coupler.

Please also refer to FIGS. 2 and 6. When the plug section 11 of the male coupler 1 is plugged from the front end of the main body 2 of the female coupler connection structure into the plugging passage 20 in the main body 2, the curved top end surfaces 412a and the front pressing surfaces 413b of the actuation portions 412 are pushed by the plug section 11 that has been plugged into the plugging passage 20, and the actuation portions 412 are pushed by the male coupler 1 to rotate toward an inner side of the plugging passage 20.

Figure 7:
FIG. 7 is a second fragmentary and enlarged sectional side view showing the portion of the female coupler connection structure of FIG. 5 for connecting with the male coupler.

Please also refer to FIGS. 2 and 7. When the male coupler 1 is moving into the plugging passage 20, the actuation portions 412 would finally engage with the retaining groove 12 on the male coupler 1 to limit the male coupler 1 from moving axially. After the actuation portions 412 are engaged with the retaining groove 12 of the male coupler 1, the top end surfaces 412*a* and the front pressing surfaces 413*b* of the actuation portions 412 are tightly pressed against an inner wall surface of the retaining groove 12, while the actuation portions 412 are forward pressed tightly against the inner walls of the through openings 210*a*. Meanwhile, the spring push members 43 push forward against the rear pressing surfaces 414*b* to limit the retaining groove 12 of the male coupler 1 from moving axially. In more detail, the actuation portions 412 are held in place in the retaining groove 12 of the male coupler 1, such that the retaining groove 12 is restricted in position and the male coupler 1 is unable to axially move outward from the plugging passage 20. That is, the male coupler 1 is now axially limited in place.

In other words, at this point, the pin members 41 are stopped from rotating toward an outer side of the plugging passage 20 that is located at a front end of the female coupler connection structure. If there is any external force that pulls the male coupler 1, the pull force applied to the male coupler 1 would be transferred via the inner wall surface of the retaining groove 12 to the top end surfaces 412*a* and the front flat pressing surfaces 413*b* of the pin members 41. That is, since the pull force applied to the pin members 41 is offset by the front side walls 413*a* of the pin members 41 and the inner walls of the through holes 210*a*, the male coupler 1 is limited from moving axially in a direction opposite to the female coupler connection structure. Therefore, the male coupler 1 is stably and securely connected to the female coupler connection structure.

Figure 8:
FIG. 8 is a third fragmentary and enlarged sectional side view showing the portion of the female coupler connection structure of FIG. 5 for connecting with the male coupler.

Please also refer to FIGS. 2 and 8. If the user applies a force to pull or push the pulling cover 5 toward a rear end of the female coupler connection structure, the retaining module 4 will be brought to move backward and elastically compress the spring 3. The retaining module 4 moved backward would bring the pin members 41 to move backward at the same time. Meanwhile, the front side walls 413*a* of the actuation portions 412 are no longer limited by the inner walls of the through openings 210*a* and a space required for rotation appears between the pin members 41 and the inner walls of the through openings 210*a*.

Figure 9:
FIG. 9 is a fourth fragmentary and enlarged sectional side view showing the portion of the female coupler connection structure of FIG. 5 for connecting with the male coupler.

Please refer to FIGS. 2 and 9. When the inner wall surface of the retaining groove 12 of the male coupler 1 pushes against the pin members 41, the pin members 41 would rotate in a direction toward an outer side of the plugging passage 20 that is located at the front end of the female coupler connection structure. At this point, the pin members 41 rotating toward the outer side of the plugging passage 20 can separate from the retaining groove 12 of the male coupler 1. That is, the retaining groove 12 of the male coupler 1 is no longer limited by the pin members 41 from moving axially, and the male coupler 1 can be now moved toward the outer side of the plugging passage 20. Thereafter, an external force can be applied to move the male coupler 1 to the outer side of the plugging passage 20, enabling the male coupler 1 to be smoothly separated from the plugging passage 20. Finally, please refer to FIG. 5. When the male coupler 1 is completely separated from the plugging passage 20, the pin members 41 will return to their initial positions.

According to the above, it is understood the pin members 41 in the present invention can rotate in and relative to the tangential slots 210 and the through openings 210*a*, so as to allow the male coupler 1 and the female coupler connection structure to quickly connect or disconnect to and from each other. With the present invention, the connecting operation can be completed as soon as the pin members 41 are rotated to pass the retaining groove 12, and the radius of rotation of the pin members 41 is smaller than an axial width of the tangential slots 210 or the through openings 210*a*. Therefore, with the pin members 41 of the retaining module 4 and the pulling cover 5, the male coupler and the female coupler connection structure of the present invention can be fully connected or disconnected to and from each other within largely shortened operating distance.

Moreover, with the present invention, the retaining module 4 can displace axially in the tangential slots 210 and the through openings 210*a*, so that the pin members 41 can effectively rotate toward or away from the plugging passage 20 within the axial width of the tangential slots 210 and the through openings 210*a* to complete the connection and disconnection of the male coupler 1 with and from the female coupler connection structure. In brief, with the present invention, the male coupler 1 and the female coupler connection structure can be quickly connected or disconnected via the pin members 41 and the plugging passage 20. And, with the pulling cover 5, the male coupler 1 locked to the female coupler connection structure can be unlocked and separated from the female coupler connection structure simply by pulling the pulling cover 5 backward relative to the main body 2 of the female coupler connection structure.

In brief, as soon as the male coupler 1 is plugged into the female coupler connection structure, the connection of the male with the female coupler is completed; and when the pulling cover 5 is pulled backward, the disconnection of the male coupler from the female coupler connection structure is completed. The male coupler and the female coupler connection structure can be quickly and easily connected and disconnected even in a relatively narrowed space, such as in the cabinets of data centers, for example.

In addition, the pin members 41 of the retaining module 4 in the through openings 210*a* of the present invention also limits an axial surface relative to a vertical surface. The retaining module 4 is abutted against the inner walls of the tangential slots 210 to avoid the problems of unsecured and easily separated connection caused by size tolerance or pushing by unexpected external force. Therefore, the female coupler connection structure of the present invention has the advantages of requiring a relatively short operating distance that facilitates quick connection and disconnection of the female and male couplers, more secured connection, and reduced structural dimensions.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A female coupler connection structure comprising:
a main body, being internally provided with a plugging passage axially extending therethrough and having an engagement section located at a front end thereof; the engagement section having two tangential slots on diametrically opposite sides of a peripheral wall of the engagement section, and the tangential slots respectively defining a through opening communicable with the plugging passage;
a retaining module, being provided around an outer side of the engagement section and having at least a portion thereof being fitted in the tangential slots; the retaining module including at least one pin member pivotally mounted on the retaining module adjacent to the tangential slots, the pin member having an actuation portion passing the through opening into the plugging passage;

a spring, being fitted on around the engagement section and having an end pressed against a rear end of the retaining module and another end pressed against an annular locating groove formed on around the engagement section; and a pulling cover, being assembled to an outer side of the spring and the retaining module with a front end of the retaining module pressed against the pulling cover.

2. The female coupler connection structure as claimed in claim 1, wherein the retaining module includes two fixing frames and two spring push members; the fixing frames respectively having a generally C-shaped configuration and with a degree of elasticity, a middle section of each of the C-shaped fixing frames having a transverse section in the form of a straight bar, and the two fixing frames being located at an upper side and a lower side and being snap-joined to form a substantially loop-shaped body for fitting around the engagement section while the two transverse sections are set in the two tangential slots, such that the retaining module is axially immovably retained to the main body; the two spring push members located at a left and a right side and being snap-joined to be fitted around the engagement section; and the spring push members being axially located behind the fixing frames.

3. The female coupler connection structure as claimed in claim 2, wherein each of the two spring push members includes two horizontal tenons, which are correspondingly located at top and lower ends of the upright C-shaped spring push member; the horizontal tenons of the spring push members being projected toward a front end of the main body, and the upper and lower transverse sections of the fixing frames being clamped in a vertical space between two upper and two lower horizontal tenons of the spring push members, such that the spring push members and the fixing frames are assembled with each other to form the retaining module for fitting on around the main body; and the two spring push members providing two balanced limiting force to the fixing frames from a right and a left side thereof.

4. The female coupler connection structure as claimed in claim 2, wherein the transverse sections of the fixing frames, which are clamped between the two upper and the two lower horizontal tenons of the two spring push members, are respectively provided at upper and lower outer sides with a recessed portion.

5. The female coupler connection structure as claimed in claim 2, wherein the two C-shaped fixing frames are provided on respective two ends, where the upper and the lower fixing frames are joined, with two insertion holes and two corresponding insertion bosses, such that two fixing frames having the same configuration are up-down symmetrically connected to each other through engagement of the insertion holes with the insertion bosses.

6. The female coupler connection structure as claimed in claim 2, wherein the fixing frames are provided on their respective front side with two pivotal grooves, which are recessed from the same side of the transverse section and located at two lateral ends of the transverse section for pivotally receiving a shaft portion of the pin member therein; and the fixing frames being further provided at a central area of respective transverse section with a gap for receiving the pin member therein.

7. The female coupler connection structure as claimed in claim 6, wherein the transverse sections are provided on respective one side radially facing toward the through openings with a protruded stop portion, and the shaft portions of the pin members being received in the pivotal grooves while the stop portions are abutted on and push against the shaft portions, such that the shaft portions are stopped from moving.

8. The female coupler connection structure as claimed in claim 6, wherein the actuation portions of the pin members respectively have a front end in the form of a curved top end surface; the curved top end surface being extended from two opposite sides thereof to form a front flat pressing surface and a rear flat pressing surface, and a front side wall being formed between the front flat pressing surface and the shaft portion.

9. The female coupler connection structure as claimed in claim 2, wherein the pulling cover includes a linkage portion, which is formed by radially inward reducing a front end of the pulling cover, and the fixing frames having their respective front end pressed against the linkage portion.

* * * * *